July 5, 1949.    A. L. CODERRE    2,474,806

LIQUID MEASURING DEVICE

Filed April 16, 1947

Inventor
Aylmer L. Coderre
by Parker & Carter
Attorneys

Patented July 5, 1949

2,474,806

UNITED STATES PATENT OFFICE 2,474,806

LIQUID MEASURING DEVICE

Aylmer L. Coderre, St. Anne, Ill.

Application April 16, 1947, Serial No. 741,753

11 Claims. (Cl. 116—67)

This invention relates to a measuring device for measuring the level of liquid within a container. It has for one object to provide means for insuring the proper insertion of the device to the full degree necessary to accomplish adequate measurement.

Another object is to provide a measuring "oil stick" for measuring the level of oil in the crankcase of an engine. It is recognized that unless this stick is inserted fully the reading may be inaccurate and the stick may fail to indicate the full quantity of liquid present in the crankcase, and hence an unnecessary quantity of oil may be added. An object of the invention is, therefore, to provide a means compelling the one making the measurement to insert the measuring stick fully, and this means includes an audible signal which can be operated only upon full insertion.

Another object is to provide a means for preventing deliberate operation of the audible device by an operator without making an accurate measurement.

Other objects will appear from time to time throughout the specification and claims.

This invention is illustrated more or less diagrammatically in the accompanying drawings, wherein.

Like parts are indicated by like characters throughout the specification and the drawings.

Figure 2:
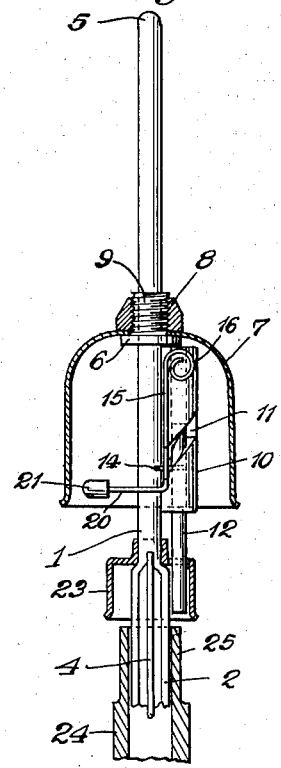
Figure 2 is a side elevation of a measuring device with parts in section, illustrating it at the commencement of use.
Figure 3:
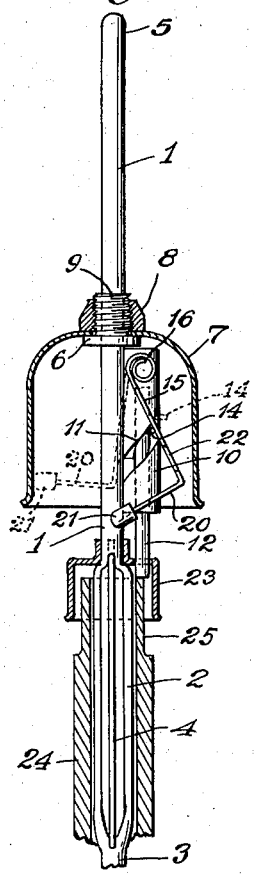
Figure 3 is a view similar to Figure 2, illustrating the device at the time of use.

The device includes a measuring stick 1 which may be provided with a laterally bent portion 2 which, as shown particularly in Figures 2 and 3, is flattened and of greater width than the portion 1. These parts may be integral or may be separately made and secured together. If desired, the stick includes a portion 3 below the portion 2 which is of the same size as the portion 1 and axially aligned with it, although the invention is not limited to this detail of construction. If desired, a spring member 4 may be secured to the stick, overlying the flattened portion 2. The spring serves as a cushioning member when the device is inserted.

A handle 5 may conveniently be formed in the portion 1 and if present it is preferably positioned opposite the member 4 so that they lie generally in the same plane and on opposite sides of the stick portion 1. A stop 6 is fixed on the portion 1 and a bell 7 is positioned on the portion 1 and against the stop 6. A nut 8 holds the bell in place. If desired, the portion 1 may be threaded to receive the nut 8 or, as shown, the stop 6 may carry a threaded enlargement 9, the stop being itself welded or otherwise secured to the member 1.

A hollow and more or less tubular member 10 is fixed to the member 1 by welding, soldering or otherwise. This member is provided with a cam slot 11 shown particularly in Figures 2, 3 and 4. A plunger 12 is positioned within the member 10 and a spring 13 may, if desired, be positioned within the member 10 and above the plunger 12 to urge it downwardly. Since the device is normally used in an upright position, the spring 13 may be dispensed with, if desired, and gravity alone will normally be sufficient to carry the plunger downwardly. The plunger carries a cam follower 14 which extends into the slot 11.

Figure 4:
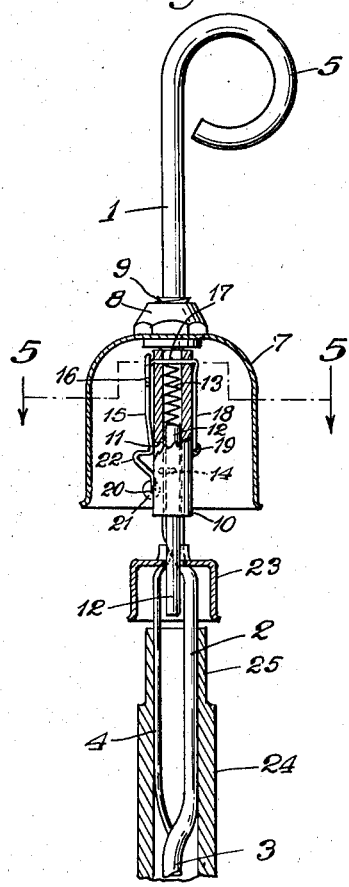
Figure 4 is a view similar to Figure 3, showing the device rotated to an angle of 90°.
Figure 1:
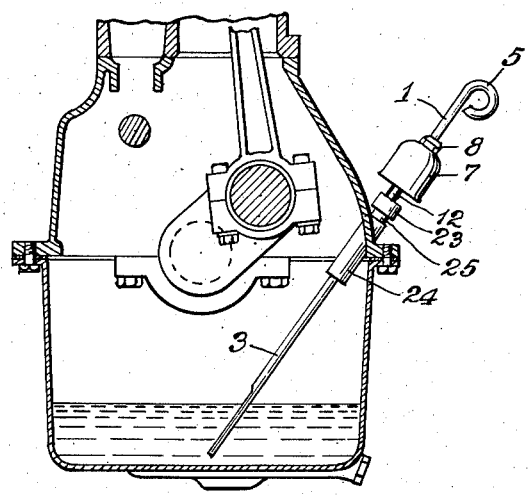
Figure 1 is a section through the crankcase of an engine with the measuring device in place.
Figure 5:
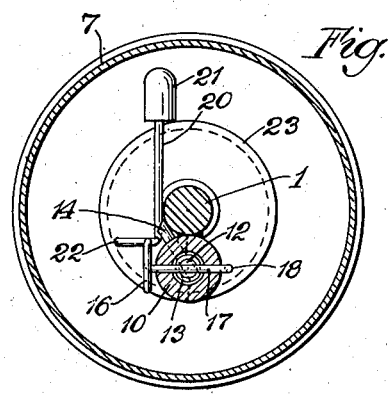
Figure 5 is a section taken on an enlarged scale at line 5—5 of Figure 4.

A spring 15 is secured to the member 10 and preferably includes a coil portion 16. It may extend through the member 10, as at 17, as shown in Figure 4, and its opposite end 18 is welded or soldered, as at 19, to the member 10. Where the spring is positioned as shown in Figure 4, it serves as a stop or positioning member at the upper end of the coil spring 13. At its lower end the spring 15 may have a laterally bent portion 20 and carries a bell striker or clapper 21. The spring 15 is provided with a laterally bent portion 22 which, as shown particularly in Figures 4 and 5, extends outwardly away from the member 10, a distance greater than the length of the cam follower 14, at a point which overlies the cam slot 11 when the spring is in the downward or inactive position of Figures 2, 4 and 5.

If desired, the handle portion 1 may have secured to it a downwardly directed cup 23 which serves as a positioning and stop member. It may, if desired, be omitted, or a stop member of another design might be used. The invention is not limited to any stop member.

The oil stick is normally used by insertion into an opening in the crankcase. This opening may be formed in a tubular member 24, as shown, and this member may be reduced in size toward its upper end, as at 25.

Although I have shown an operative form of my invention, it will be recognized that many changes in the form, shape and arrangement of parts can be made without departing from the spirit of the invention, and my showing is, therefore, to be taken as, in a sense, diagrammatic.

The use and operation of this invention are as follows:

With the parts as shown, the device is inserted in the crankcase of an engine. Ordinarily it remains there except when the depth of the oil is to be measured. When that is done, the stick is pulled out, wiped off and reinserted. The level of the oil will show on the stick when it is removed thereafter. It is important to make sure that the stick is fully inserted as far as it will go so that it will indicate clearly the full level of oil. If the stick were inserted only partly, it would give a false and inaccurate reading.

As the stick is inserted the plunger 12 comes in contact either with the member 25 or some other member near the hole in the crankcase or fixed in relation thereto, and it is stopped—that is to say, the stick continues to move downwardly while the plunger is stopped. If the spring 13 is present, the plunger depresses that spring.

As the stick is moved downwardly while the plunger stands still, the cam follower 14 rides upwardly along the upper surface of the cam slot 11, and after a certain movement it strikes the spring 15 and moves it from the position of Figure 2 to the position of Figure 3. When the cam follower reaches approximately the top of the cam slot, the spring 15 slips off the follower and moves to the dotted line position of Figure 3 in which the clapper 21 strikes the bell 7 and rings it. This will occur only when the stick as a whole has been pushed as far into the crankcase as necessary to give an accurate reading. Thus when the stick has been pushed fully into the crankcase the bell is rung and an audible signal is given which indicates clearly that the stick has been pushed far enough in to give an accurate reading.

The bell overhangs the clapper and the cam slot and cam follower and thus prevents an operator from moving the bell clapper to cause the bell to ring when proper insertion has not been made. The plunger is situated far enough from the handle so that it is difficult, not to say impossible, for an operator to push up on the plunger with one hand while pushing down on the handle with the other hand to make an inaccurate reading by causing the bell to ring upon insufficient insertion.

The device may be varied from the exact form shown and the operation of the plunger to cause the bell to ring may be accomplished by contact with any member or surface so positioned with respect to the crankcase that the plunger will be moved to cause the bell to ring at the time when the stick has been inserted to a degree sufficient for an accurate measurement.

In operation the plunger is forced upwardly and moves the spring and as the follower 14 reaches the upper end of the cam slot, the spring falls from the follower and causes the bell to be rung. After the spring has returned to its position of rest, the plunger may return to the down position as soon as it is no longer being positively forced upwardly. In doing this the cam follower rides on the lower side of the slot 11 and passes through the laterally bent portion 22 of the spring 15 which is of sufficient size to clear the cam follower 14, so that there is no contact or interference in the return movement of the plunger.

I claim:

1. In combination in a device for measuring the level of liquid in a container, means for giving an audible signal when said device has been fully inserted into the container, said means including a measuring stick adapted to be inserted into a container, a bell carried by said stick, a plunger extending downwardly, and a bell clapper movably positioned within said bell, means positioned within said bell and adapted to be actuated by said plunger to move said clapper and to ring said bell, said plunger positioned to contact a member fixed in relation to said container and adapted to move said clapper for ringing movement only after a predetermined degree of insertion into said container has been accomplished.

2. In combination in a device for measuring the level of liquid in a container, means for giving an audible signal when said device has been fully inserted into the container, said means including a measuring stick adapted to be inserted into a container, a bell carried by said stick, a plunger extending downwardly, and a bell clapper movably positioned within said bell, and cam means positioned within said bell and adapted to be actuated by said plunger to move said clapper and to ring said bell, said plunger positioned to contact a member fixed in relation to said container and adapted to move said clapper for ringing movement only after a predetermined degree of insertion into said container has been accomplished.

3. In combination in a device for measuring the level of liquid in a container, means for giving an audible signal when said device has been fully inserted into the container, said means including a measuring stick adapted to be inserted into a container, a bell carried by said stick, a plunger extending downwardly beyond the end of said bell, and a bell clapper movably positioned within said bell, and means positioned within said bell and adapted to be actuated by said plunger to move said clapper and to ring said bell, said plunger positioned to contact a member fixed in relation to said container and adapted to move said clapper for ringing movement only after a predetermined degree of insertion into said container has been accomplished.

4. In combination in a device for measuring the level of liquid in a container, means for giving an audible signal when said device has been fully inserted into the container, said means including a measuring stick adapted to be inserted into a container, a bell carried by said stick, a plunger extending downwardly beyond the end of said bell, and a bell clapper movably positioned within said bell, and cam means positioned within said bell and adapted to be actuated by said plunger to move said clapper and to ring said bell, said plunger positioned to contact a member fixed in relation to said container and adapted to move said clapper for ringing movement only after a predetermined degree of insertion into said container has been accomplished.

5. In combination in a liquid level measuring device, a measuring stick, a bell mounted on said stick, and means for ringing the bell when the stick has been inserted a predetermined distance into a liquid container, said ringing means including a member movably mounted upon said stick and projecting downwardly beyond said bell, a guide within which said member is mounted for movement, a cam slot formed in said guide adjacent said member, a cam follower fixed on said member and projecting into said slot, a bell clapper and a movable support therefor, said support including a spring part fixed at one end with respect to said stick and carrying said clapper at its other end, said spring part extending across said cam slot and adapted to be moved by said cam follower when said member is moved in one direction with respect to said cam slot, said spring part being bent away from said cam follower, whereby the cam follower may move in one direction along the cam slot without contacting said spring part.

6. In combination in a liquid level measuring device, a measuring stick, a bell mounted on said stick, and means for ringing the bell when the stick has been inserted a predetermined distance into a liquid container, said ringing means including a member movably mounted upon said stick and projecting downwardly beyond said bell, a guide within which said member is mounted for movement, a spring biased to urge said member outwardly, a cam slot formed in said guide adjacent said member, a cam follower fixed on said member and projecting into said slot, a bell clapper and a movable support therefor, said support including a spring part fixed at one end with respect to said stick and carrying said clapper at its other end, said spring part extending across said cam slot and adapted to be moved by said cam follower when said member is moved in one direction with respect to said cam slot, said spring part being bent away from said cam follower, whereby the cam follower may move in one direction along the cam slot without contacting said spring part.

7. In combination in a liquid level measuring device, a measuring stick, said stick having a laterally bent, flattened portion and a guiding spring member positioned opposite said portion and spaced away from it, a bell mounted on said stick, and means for ringing the bell when the stick has been inserted a predetermined distance into a liquid container, said ringing means including a member movably mounted upon said stick and projecting downwardly beyond said bell, a guide within which said member is mounted for movement, a spring biased to urge said member outwardly, a cam slot formed in said guide adjacent said member, a cam follower fixed on said member and projecting into said slot, a bell clapper and a movable support therefor, said support including a spring part fixed at one end with respect to said stick and carrying said clapper at its other end, said spring part extending across said cam slot and adapted to be moved by said cam follower when said member is moved in one direction with respect to said cam slot, said spring part being bent away from said cam follower, whereby the cam follower may move in one direction along the cam slot without contacting said spring part.

8. In combination in a device for measuring the level of liquid in a container, means for giving an audible signal when said device has been fully inserted into the container, said means including a measuring stick adapted to be inserted into a container, a bell carried by said stick, a plunger extending downwardly, and a bell clapper movably positioned within said bell, means positioned within said bell and adapted to be actuated by said plunger to move said clapper and to ring said bell, said plunger positioned to contact a member fixed in relation to said container and adapted to move said clapper for ringing movement only after a predetermined degree of insertion into said container has been accomplished, and a housing enclosing the lower end of said plunger.

9. In combination in a device for measuring the level of liquid in a container, means for giving an audible signal when said device has been fully inserted into the container, said means including a measuring stick adapted to be inserted into a container, a bell carried by said stick, a plunger extending downwardly, and a bell clapper movably positioned within said bell, means positioned within said bell and adapted to be actuated by said plunger to move said clapper and to ring said bell, said plunger positioned to contact a member fixed in relation to said container and adapted to move said clapper for ringing movement only after a predetermined degree of insertion into said container has been accomplished, and a housing enclosing the lower end of said plunger and shaped to fit over said member fixed in relation to said container.

10. In combination in a device for measuring the level of liquid in a container, means for giving an audible signal when said device has been fully inserted into the container, said means including a measuring stick adapted to be inserted into a container, a bell carried by said stick, a plunger extending downwardly, and a bell clapper movably positioned with respect to said bell, means adapted to be actuated by said plunger to move said clapper and to ring said bell, said plunger positioned to contact a member fixed in relation to said container and adapted to move said clapper for ringing movement only after a predetermined degree of insertion into said container has been accomplished.

11. In combination in a device for measuring the level of liquid in a container, means for giving an audible signal when said device has been fully inserted into the container, said means including a measuring stick adapted to be inserted into a container, a bell carried by said stick, a plunger extending downwardly, and a bell clapper movably positioned with respect to said bell, means adapted to be actuated by said plunger to move said clapper and to ring said bell, said plunger positioned to contact a member fixed in relation to said container and adapted to move said clapper for ringing movement only after a predetermined degree of insertion into said container has been accomplished, and a member enclosing the lower end of said plunger.

AYLMER L. CODERRE.

REFERENCES CITED

The following references are of record in the file of this patent:

UNITED STATES PATENTS

| Number | Name | Date |
| --- | --- | --- |
| 1,364,490 | Feltham | Jan. 4, 1921 |
| 2,314,430 | Smith | Mar. 23, 1943 |